United States Patent
Ono et al.

[15] 3,671,577
[45] June 20, 1972

[54] PROCESS FOR PRODUCING 1,4-DIACYLOXY-2-BUTENE

[72] Inventors: Isao Ono; Kentaro Fukabori; Seiichi Shimomura, all of Yamaguchi, Japan

[73] Assignee: Toyo Soda Manufacturing Co., Ltd., Oaza Tonda, Nanyo-cho, Tsuno-gun, Yamaguchi-ken, Japan

[22] Filed: March 13, 1970

[21] Appl. No.: 19,509

[30] Foreign Application Priority Data

March 18, 1969 Japan..................................44/20099

[52] U.S. Cl......................................260/497 A, 260/486 R
[51] Int. Cl.............................................C07c 67/04
[58] Field of Search..................................260/497 A, 486 R

[56] References Cited

FOREIGN PATENTS OR APPLICATIONS 1,191,366  4/1965  Germany..........................260/497 A
1,138,366  1/1969  Great Britain....................260/497 A

OTHER PUBLICATIONS

Burwell– Mechanism of Heterogeneous Catalysis C & EN 8/22/66
Webster's New World Dictionary 2nd College Ed. World Pub. Co. (1968) pg.222

*Primary Examiner*—Lorraine A. Weinberger
*Assistant Examiner*—Richard D. Kelly
*Attorney*—Flynn & Frishauf

[57] ABSTRACT

1,4-diacyloxy-2-butene is produced by passing a gaseous mixture of butadiene, an aliphatic monocarboxylic acid and an oxygen-containing gas over a catalyst comprising at least one of palladium, iridium, platinum, rhodium and ruthenium and carboxylate and inorganic acid salt thereof.

13 Claims, No Drawings

PROCESS FOR PRODUCING 1,4-DIACYLOXY-2-BUTENE

It has been proposed that to produce vinyl acetate a mixture of ethylene, acetic acid and oxygen be passed over a catalyst comprising at least one of palladium, platinum, rhodium, ruthenium and iridium, and optionally, in the presence of either oxidant, such as, copper or an alkali metal, alkaline earth metal or alphatic carboxylate thereof.

It has now been found that 1,4-diacyloxy-2-butene having the general formula

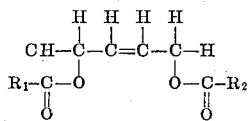

wherein $R_1$ and $R_2$ represent a hydrogen atom, an alkyl or an alkenyl group, is produced by passing a mixed gas of butadiene, an aliphatic monocarboxylic acid and an oxygen-containing gas over a catalyst bed, said catalyst bed being comprised of at least one of metallic palladium, platinum, rhodium, ruthenium and iridium or a carboxylate or inorganic acid salt of such metals, and optionally, either at least one metal such as copper, silver, zinc, nickel, chromium, iron, cobalt, cadmium, tin, lead, molybdenum, tungsten, alkali metal and alkaline earth metal or at least one carboxylate salt or inorganic acid salt of such metals, or both.

Though the product according to this invention in the above formula is expressed as a cis-compound, it should be understood that the production of the product containing a trans-compound is within the scope of this invention.

British Patent No. 1,138,366 deals with the production of 1,4-diacyloxy-2-butene, wherein butadiene is contacted with acetic acid in liquid phase in the presence of a catalyst system comprising palladium chloride, copper acetate and lithium acetate. However, this process has the following inherent disadvantages; (1) there is low selectivity of 1,4-diacetoxy-2-butene, that is, the product is obtained in a 50:50 proportion of 1,4 and 3,4 isomers of diacetoxy-butene-2; (2) it is difficult to separate the catalyst employed and the product, because the product possesses a high boiling point and is unstable at high temperature at which it tends to decompose and/or polymerize; thus it is necessary to recover the product by first subjecting the reaction mass to distillation of solvent, and secondly to distill off the product at a higher temperatures; and (3) the part remaining after distillation contains the catalyst components as well as a considerable amount of undesirable high boiling point compounds, so there is the problem of separating such impurities.

In contrast, according to this invention the reaction is carried out in gaseous state on the fixed catalyst bed and the product contains essentially desired reaction product, unreacted reactants and carboxylic acid, and therefore the product is easily recovered by cooling the reacted mass from which the liquid phase is separated and then distilling out the carboxylic acid from the liquid. Further, a more important feature of this invention is the high selectivity of desired product; the 1,4-dicarboxy-2-butene content of the product is from 80 to 90 percent. The reaction according to this invention can be carried out successfully by catalytic action of at least one metal of palladium, platinum, rhodium, ruthenium and iridium, or carboxylate or inorganic acid salt of such metal. Such catalyst may be supported on a suitable carrier, if desired. Furthermore, the reaction can be accelerated by incorporating a promoter, for example, at least one metal of copper, silver, zinc, nickel, chromium, iron, tungsten, alkali metal and alkaline earth metal, or carboxylate or inorganic acid salt of such metals. For best results the promoter should be incorporated in the catalyst system, because this improves the activity of the system. Preferred promoters are a carboxylate of an alkali metal or an alkaline earth metal. The inorganic salts employed in the catalyst system include chloride, sulfate, nitrate and phosphate. The esterification agents according to this invention include saturated and unsaturated aliphatic monocarboxylic acids having carbon atoms of less than 8, such as formic acid, acetic acid, propionic acid, butyric acid and acrylic acid. The oxygen-containing gas employed in the reaction according to this invention is oxygen which can be diluted with an inert gas, such as nitrogen and carbon dioxide. The most suitable oxygen-containing gas is air which is the least costly and most easily available gas. Crude butadiene containing a small amount of a lower saturated hydrocarbon, such as ethane, propane and butane, can also be used. The reaction conditions (temperature and pressure) are not critical. However, in general, the reaction temperature range is from 150° – 350° C., preferably 200° to 300° C., and the reaction pressure is atmospheric to superatmospheric pressure. The only requirement is that the raw materials and product must be maintained in gaseous condition. The proportion of oxygen, butadiene and carboxylic acid in the feed gas can widely vary from 1 to 99 percent by volume, respectively; however, the preferred proportion is 5 to 50 percent by volume of oxygen, 5 to 85 percent by volume of butadiene and 5 to 60 percent by volume of carboxylic acid. The desired proportion of the carboxylic acid in the feed gas is achieved by bubbling butadiene and oxygen into the carboxylic acid in the liquid state, which is maintained at a temperature to obtain a mixed gas saturated with the acid. Alternatively, gaseous carboxylic acid which is gasified in a vaporizer is admixed with the other reactants in the gaseous state.

The catalyst system employed in this invention can conveniently be prepared by depositing at least one salt of a catalyst metal and at least one salt of a promoter metal onto a carrier at the same time or separately, calcining the salts on the carrier into oxides and reducing the oxides with hydrogen into elementary metals. The salts of a metal for catalyst include, for example, palladium chloride, rhodium chloride, ruthenium chloride, chloroplatinic acid and iridium chloride, and the salts for promoter include, for example, nitrate of copper, silver, zinc, nickel, iron, cobalt, cadmium, tin and lead, ammonium salt of chromic acid, molybdic acid and tungstic acid and chloride of lithium, sodium, potassium, calcium, magnesium and barium. Another process for preparation of the catalyst comprises the steps of depositing at least one salt for catalyst on a carrier, calcining in the atmosphere, hydrogen reducing and, then depositing the promoter component on the carrier so treated and thoroughly drying on a steam bath. The catalyst system thus prepared can be used for the purpose of this invention without any further treatment. These procedures are suitable for employment of carboxylate of alkaline earth metal as promoter. The reducing agent employed in the preparation of catalyst is not restricted to hydrogen, but other reducing agents, such as formaline and hydrazine, can also successfully be employed. Among the carriers, alumina and active carbon are preferred; however, other carriers usually employed in catalyst systems, for example natural or artificial diatomaceous earth, silica and magnesia can be employed, independently or in combination therewith.

EXAMPLE 1

Into a solution of 0.85g of anhydrous palladium chloride in 100ml of 10 percent hydrochloric acid was added 100g of granular active carbon having an average diameter of 3mm and the mixture was dried by evaporation. The granules were packed into a reaction tube of Pyrex glass having an inner diameter of 2.6cm and a length of 60cm and were subjected to reduction by passing hydrogen therethrough at a rate of 100ml/min. at a temperature of 240° C. for 24 hours to prepare a catalyst system. The reaction tube was maintained at 240° C. into which was introduced a mixture of butadiene, oxygen and acetic acid in a molar ratio of 40:10:50 at a space-velocity of 200hr$^{-1}$ to form 1,4-diacetoxy-2-butene (DAB). The conversion of butadiene was 0.3 percent and the selectivity of DAB was 80 percent.

EXAMPLES 2 to 7

The catalyst obtained in Example 1 was admixed with various promoter solutions and the mixture permitted to dry, the promoters and solvents being given in Table 1. The procedures of Example 1 were repeated using such catalyst systems. The results are given in Table 1.

TABLE 1

| Example No. | 5g of promoter/100ml of solvent | conversion of butadiene | selectivity of DAB |
|---|---|---|---|
| 2 | sodium acetate/glacial acetic acid | 1.1% | 85% |
| 3 | lithium acetate/glacial acetic acid | 1.6% | 82% |
| 4 | cupric chloride/10% hydrochloric acid | 0.4% | 76% |
| 5 | cupric acetate/glacial acetic acid | 0.7% | 80% |
| 6 | magnesium acetate/glacial acetic acid | 0.5% | 93% |
| 7 | nickel nitrate/5% nitric acid | 1.5% | 53% |

By comparing the results of Example 1 with the data in Table 1, the effect of such promoters is made clear. In order to prove that the action of the added salts is not catalytic but only as promoter, the following experiment A was carried out.

EXPERIMENT A 100g of granular active carbon having an average diameter of 3mm was added to a solution of 5g of lithium acetate in 100ml of acetic acid, and the mixture was permitted to dry. Following the procedures of Example 1, the mixed gas was treated with the granules, but no formation of DAB and no substantial change of the reactants were observed.

EXAMPLE 8

The procedures disclosed in Example 1 were repeated using propionic acid in place of acetic acid. The conversion of butadiene was 0.26 percent and the selectivity of butadiene into 1, 4-dipropionoyloxy-2-butene was 83 percent.

EXAMPLE 9

A solution of 2g of palladium acetate and 5g of potassium acetate in 200ml of acetic acid and 50g of granular active alumina having an average diameter of 3mm were admixed and the mixture was permitted to dry. The granules so treated were packed into a tube of Pyrex glass having an inner diameter of 2.6cm. The reaction tube was maintained at 200° C. into which was introduced a mixed gas of butadiene, oxygen, nitrogen and of acetic acid in a molar ratio of 40:8:2:50 at a space-velocity of 50hr$^{-1}$. The conversion of butadiene was 1.2 percent and the selectivity was 84 percent.

EXAMPLE 10

In this example, the reaction conditions were similar to those in Example 9, except that the reaction temperature was changed to 270° C. and the space-velocity was set at 800hr$^{-1}$. 0.24 percent of conversion and 92 percent of selectivity were obtained.

EXAMPLE 11

0.45g of $H_2PtCl_6 \cdot H_2O$ and 2.2g of $Zn(NO_3)_2 \cdot H_2O$ were dissolved in water to form a solution to which 10g of granular active carbon was added and the mixture permitted to dry. The granules so treated were placed in 100ml of 5 percent aqueous ammonia; then the mixture was heated to remove excess ammonia. The granules so treated were washed with water and permitted to dry and packed into a reaction tube and then subjected to reduction treatment with hydrogen at a passing velocity of 100ml/min. at 250° C. for 16 hours. A mixed gas of butadiene, butane, oxygen and acetic acid in a molar ratio of 40:10:10:40 was passed over the catalyst at a space-velocity of 200hr$^{-1}$, and during the reaction the temperature of the reaction zone was maintained at 240° C. The conversion of butadiene was 1.2 percent and the selectivity of DAB was 72 percent.

EXAMPLE 12

An aqueous solution of 0.5g of rhodium trichloride $O_{24} \cdot 4A4H_2O$ was mixed with 10g of granular alumina having an average diameter of 3mm; the mixture was permitted to dry, average diameter of 3mm; the mixture was permitted to dry, then the granules were calcined in the atmosphere at 400° C. for 7 hours. The granules were subjected to reduction treatment and the catalyst so obtained was used for converting butadiene into DAB according to the procedures in Example 12. The conversion of butadiene was 0.8 percent and the selectivity of DAB was 65 percent.

EXAMPLES 13 to 18

10g of granular active carbon was impregnated with various salts as catalyst and promoter components as given in Table 2. The granules were treated with aqueous ammonia to form hydroxides and subjected to a reduction treatment with hydrogen. A mixed gas of butadiene, acetic acid and air in a molar ratio of 30:40:30 was passed at a space velocity of 100hr$^{-1}$ over the catalyst which was maintained at a temperature of 240° C. The conversion of butadiene and the selectivity of DAB are given in Table 2.

TABLE 2

| Example No. | Catalyst | Promoter | conversion | selectivity |
|---|---|---|---|---|
| 13 | RuCl₃ 0.45g | Cd(No₃)₂·4H₂O 2.2g | 0.7% | 56% |
| 14 | RuCl₃ 0.45g | AgNo₃ 3.6g | 1.3% | 51% |
| 15 | RuCl₃ 0.45g | SnCl₂·2H₂O 4.8g | 1.4% | 55% |
| 16 | PdCl₂ 0.50g | (NH₄)₆W₇O₂₄·6H₂O 4.0g | 2.8% | 43% |
| 17 | IrCl₄ 0.60g | LiCl 2.1g | 1.2% | 52% |
| 18 | PdCl₂ 0.50g | Pb(NO₃)₂ 5.0g | 1.1% | 50% |

EXAMPLES 19 to 22

The procedures disclosed in Example 3 were repeated using the various carboxylic acids listed in Table 3 in place of acetic acid. The conversion of butadiene and the selectivity of 1, 4-dicarboxyl-2-butene are given in the Table.

TABLE 3

| Example No. | Aliphatic carboxylic acid | Conversion | Selectivity |
|---|---|---|---|
| 19 | formic acid | 1.8% | 84% |
| 20 | propionic acid | 1.1% | 78% |
| 21 | n-caproic acid | 1.5% | 86% |
| 22 | n-caprylic acid | 1.3% | 85% |

EXAMPLE 23

Example 3 was followed but the reaction temperature was changed to 150° C. The conversion and the selectivity were 0.1 percent and 90 percent.

EXAMPLE 24

Example 3 was followed, but the reaction temperature was changed to 350° C. The conversion and the selectivity were 1.5 percent and 30 percent.

EXAMPLE 25

50g of granular active alumina was impregnated with a solution of 2g of palladium acrylate and 5g of lithium acrylate in 200ml of acrylic acid, and dried at 20° C. under vacuum. The granules so treated were packed into a Pyrex glass reaction tube having an inner diameter of 2.6cm into which was introduced a mixed gas of butadiene, nitrogen, oxygen and acrylic acid in a molar ratio of 40:8:2:50 at a space-velocity of 50hr$^{-1}$200° C. The conversion of butadiene was 1.1 percent and the selectivity of butadiene into 1, 4-diacryloyloxy-2-butene was 90 percent.

EXAMPLE 26

10g of granular active carbon was added to a solution of 0.23g of $Pd(NO_3)_2$, 0.71g of $Rh(SO_4)_3 \cdot H_2O$ and 2.5g of LiCl in 100ml of water and the mixture was permitted to dry by evaporation of the water. The granules were charged into 100ml of aqueous ammonia to convert the salts into hydroxides and excess ammonia was removed from the solution by heating. The granules were subjected to reduction treatment with hydrogen as in Example 11, and then packed into a reaction tube and used for the reaction of mixed gas of butadiene, oxygen and acetic acid as in Example 1. The conversion of butadiene and the selectivity of DAB were 1.5 percent and 75 percent.

EXAMPLE 27

2g of palladium propionate and 5g of lithium propionate were dissolved into 200ml of propionic acid to form a solution to which was added 50g of granular active alumina having an average diameter of 3mm, then the liquid phase was permitted to evaporate off. The granules were packed into a reaction tube and a mixed gas of butadiene, air and propionic acid in a molar ratio of 40:10:50 was passed over the catalyst maintained at 200° C., at a space-velocity of 50hr⁻¹. The conversion of butadiene and the selectivity into 1, 4-dipropionoyloxy-2-butene were 1.3 percent and 86 percent.

What is claimed is:

1. A process for producing a 1,4-diacyloxy-2-butene having the general formula

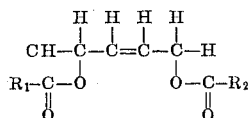

wherein $R_1$ and $R_2$ represent hydrogen and alkyl and alkenyl groups, which comprises contacting a gaseous mixture of butadiene, an aliphatic monocarboxylic acid having less than 8 carbon atoms and an oxygen-containing gas with a catalyst supported on a carrier, said catalyst consisting essentially of at least one metal (A) selected from the group consisting of palladium, platinum, rhodium, ruthenium and iridium, or a carboxylate or an inorganic salt of such a metal.

2. A process of producing a 1,4-diacyloxy-2-butene according to claim 1 wherein said catalyst is at least one metal (A) selected from the group consisting of palladium, platinum, rhodium, ruthenium, and iridium.

3. A process for producing a 1,4-diacyloxy-2-butene according to claim 1, wherein said catalyst is a carboxylate or an inorganic salt of palladium, platinum, rhodium, ruthenium and iridium.

4. A process for producing a 1,4-diacyloxy-2-butene according to claims 1, wherein said oxygen-containing gas is air.

5. A process for producing a 1,4-diacyloxy-2-butene according to claim 1, wherein said reaction is carried out at a temperature of 150° to 350° C.

6. A process for producing a 1,4-diacyloxy-2-butene according to claim 1, wherein said butadiene in the feedstock contains a small amount of a lower aliphatic saturated hydrocarbon selected from the group consisting of ethane, propane and butane.

7. A process for producing a 1,4-diacyloxy-2-butene according to claim 1, wherein the total proportion of said butadiene, aliphatic monocarboxylic acid and oxygen-containing gas in said feedstock is 1 to 98 percent by volume.

8. A process for producing a 1,4-diacyloxy-2-butene according to claim 1, wherein the proportion of said butadiene, aliphatic monocarboxylic acid and oxygen-containing gas is 5 to 85 percent, 5 to 50 percent and 5 to 60 percent, by volume, respectively.

9. A process for producing a 1,4-diacyloxy-2-butene having the general formula

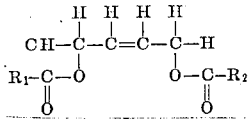

wherein $R_1$ and $R_2$ represent hydrogen and alkyl and alkenyl groups, which comprises contacting a gaseous mixture of butadiene, an aliphatic monocarboxylic acid having less than 8 carbon atoms and an oxygen-containing gas with a catalyst supported on a carrier, said catalyst consisting essentially of at least one metal (A) selected from the group consisting of palladium, platinum, rhodium, ruthenium and iridium, or a carboxylate or an inorganic salt of such a metal, and a promoter consisting essentially of at least one metal(B) selected from the group consisting of copper, zinc, an alkali metal and an alkaline earth metal, or a carboxylate or an inorganic salt of such a metal.

10. A process for producing a 1,4-diacyloxy-2-butene according to claim 9, wherein said metal(B) is at least one metal selected from the group consisting of copper, zinc, an alkali metal and an alkaline earth metal.

11. A process for producing a 1,4-diacyloxy-2-butene according to claim 9, wherein the metal (B) of said carboxylate promoter or inorganic salt promoter is selected from the group consisting of copper, zinc, an alkali metal and an alkaline earth metal.

12. A process for producing a 1,4-diacyloxy-2-butene according to claim 9, wherein said carboxylate promoter is a metal carboxylate of a saturated or unsaturated aliphatic monocarboxylic acid having less than 8 carbon atoms and a metal (B) selected from the group consisting of copper, zinc, an alkali metal and an alkaline earth metal.

13. A process for producing a 1,4-diacyloxy-2-butene according to claim 9, wherein said inorganic salt promoter is an inorganic salt of hydrochloric acid, sulfuric acid or nitric acid and a metal (B) selected from the group consisting of copper, zinc, an alkali metal and an alkaline earth metal.

* * * * *

UNITED STATES PATENT OFFICE
CERTIFICATE OF CORRECTION

Patent No. 3,671,577          Dated June 20, 1972

Inventor(s) ISAO ONO et al

It is certified that error appears in the above-identified patent and that said Letters Patent are hereby corrected as shown below:

Column 1, Formula - second line should read "H-C-C=C-C-H".

Column 3, line 59 - "$H_2PtCl_6 \cdot H_2O$" should be "$H_2PtCl_6 \cdot 6H_2O$".

Column 3, line 59 - "$Zn(NO_3)_2 \cdot H_2O$" should be "$Zn(NO_3)_2 \cdot 6H_2O$".

Column 4, line 1 - after "trichloride" insert: "$(RhCl_3 \cdot 4H_2O)$ and 3.0 g of ammonium molybdate $(NH_4)_6Mo_7$".

Column 4, line 2 - "$O_{24} \cdot 4A4H_2O$" should be "$O_{24} \cdot 4H_2O$".

Column 4, line 4 - delete.

Column 4, line 64 - after "$50hr^{-1}$", insert the following: ", while maintaining the catalyst at".

Column 4, line 69 - before "$H_2O$" insert "12".

Column 5, Claim 1 - second line of Formula should read: "H-C-C=C-C-H".

Signed and sealed this 20th day of February 1973.

(SEAL)
Attest:

EDWARD M. FLETCHER, JR.
Attesting Officer

ROBERT GOTTSCHALK
Commissioner of Patents